United States Patent [19]
Zeidler et al.

[11] Patent Number: 5,321,748
[45] Date of Patent: Jun. 14, 1994

[54] METHOD AND APPARATUS FOR TELEVISION SIGNAL SCRAMBLING USING BLOCK SHUFFLING

[75] Inventors: David E. Zeidler, Hatboro; John T. Griffin, Doylestown, both of Pa.

[73] Assignee: General Instrument Corporation, Jerrold Communications, Hatboro, Pa.

[21] Appl. No.: 907,699

[22] Filed: Jul. 2, 1992

[51] Int. Cl.$^5$ ............................................ H04N 7/167
[52] U.S. Cl. ........................................ 380/14; 380/20
[58] Field of Search .................................... 380/14, 20

[56]  References Cited
U.S. PATENT DOCUMENTS

| | | | |
|---|---|---|---|
| 4,340,906 | 7/1982 | den Toonder et al. | 358/124 |
| 4,389,671 | 6/1983 | Posner et al. | 358/124 |
| 4,405,942 | 9/1983 | Block et al. | 358/119 |
| 4,563,702 | 1/1986 | Heller et al. | 358/119 |
| 4,679,078 | 7/1987 | Wong et al. | 380/15 |
| 4,716,588 | 12/1987 | Thompson et al. | 380/20 |
| 4,736,420 | 4/1988 | Katznelson et al. | 380/11 |
| 4,742,544 | 5/1988 | Kupnicki et al. | 380/14 |
| 4,914,694 | 4/1990 | Leonard et al. | 380/14 X |
| 4,916,736 | 4/1990 | Ryan | 380/11 |
| 4,924,498 | 5/1990 | Farmer et al. | 380/15 |
| 4,926,477 | 5/1990 | Paik | 380/15 |

FOREIGN PATENT DOCUMENTS 0256286  12/1985  Japan .................................. 380/14

OTHER PUBLICATIONS

Moroney, et al., "The Video Cipher," *IEEE*, pp. 297-302 (1984).

*Primary Examiner*—Gilberto Barron, Jr.
*Attorney, Agent, or Firm*—Marshall, O'Toole, Gerstein, Murray and Borun

[57] ABSTRACT

A method and apparatus for scrambling video signals to obtain the secure transmission of video information. A block of video lines in a television raster is divided into top and bottom sub-block portions. The top and bottom sub-block portions are switched in position. The sequence of video lines within the sub-blocks are shuffled so that the resulting scrambled video signal contains blocks of video lines which have been block portion switched and shuffled from their original block portion position and their original line sequences. The size of the first block of video lines can grow and/or shrink in time so that the video appears to roll down or up the display. A pseudo-random number of sequence controls the shuffling sequence. A descrambler receives the scrambled video signal and a code identifying the shuffling sequence of the scrambled video for descrambling the video signal and returning the block portions and the video lines to their original sequences.

22 Claims, 5 Drawing Sheets

METHOD AND APPARATUS FOR TELEVISION SIGNAL SCRAMBLING USING BLOCK SHUFFLING

TECHNICAL FIELD

The present invention relates generally to encoding and decoding of video information, and more particularly to a method and apparatus to secure the transmission of video signals so that only authorized persons can view or have access to the associated video information.

BACKGROUND ART

Various systems have been proposed and are in use for scrambling television signals to obtain the secure transmission of video information. One such scrambling technique involves what has been termed "block shuffling". In block shuffling the television field consisting of contiguous video lines is divided into several blocks or groups of video lines, such as for instance eight lines in each block. The video lines within each block are then randomly shuffled or scrambled so that the original line sequence has been changed to a new scrambled line sequence within each block. The scrambled video signals are then transmitted to a receiver along with data relating to a code corresponding to the order of the randomly shuffled lines in each block.

At a receiver having a corresponding decoder, the shuffled video lines in each block are then returned to their original sequence so that the video display of each block in sequence reforms the original field. Of course, if the receiver does not contain a suitable decoder, the displayed video signals will be generally unintelligible and the information masked since the original line sequence of the displayed field has been altered.

Reference may be made for instance to Block, et al., U.S. Pat. No. 4,405,942 showing a video scrambling system in which the sequence of individual horizontal lines of video information are rearranged in a determinable manner relative to the normal sequence of lines in a raster scan field of video information. In this patent, line shuffling occurs over the entire field. For instance one or more of the original last lines of the field may appear as the first lines of the scrambled field; the original first lines may appear as the last lines of the scrambled field; and an original line can be scrambled to any position within the normal 262 line field.

In the scrambling technique shown in this patent, the video lines are stored in their original sequence in a first storage device. An address generator is encoded to control the sequence of addresses generated so that the video lines are read from the first storage device in a sequence differing from the original sequence and the scrambled sequence is transferred to a second storage device. A coded identification signal is also supplied for transmission with the video lines as they are read from storage. This patent shows a pseudo-random code generator that produces a multiple bit code word at the end of each video line which may be used to clock the video lines out of the first storage device on a line-by-line basis in a pseudo-random fashion. At a decoding station the original line sequence is reconstituted in response to the coded signal and the normal sync and blanking signals.

Reference may also be made to Kupnicki, et al., U.S. Pat. No. 4,742,544 which shows a television scrambling system where a block of a given number of video lines in a television field is selected and all of the lines within that block are randomly intermixed or scrambled to change the original line sequence. A block of four video lines are written into storage in accordance with a random four line pattern set by a corresponding code or key. As an example, if the random code consists of four numbers 3-1-2-4 forming the storage address, the sequence of video lines forming this block will be entered into storage with the first video line entered into memory position 3; the second video line entered into memory position i; the third video line entered into memory position 2; and the fourth video line entered into memory position 4.

The memory is then read sequentially so that this block of video lines is transmitted in a scrambled sequence of video lines 2-3-1-4. The random code pattern 3-1-2-4 is also transmitted in a coded data format along with the scrambled sequence of video lines.

At the receiver, the transmitted video lines for this block are read into storage in a sequential manner as the information is received so that video lines 2-3-1-4 are respectively stored in the four consecutive memory positions. The random code pattern 3-1-2-4 is recovered from the transmitted video signal and decoded so that the memory is addressed to read out the video lines from the memory in memory positions 3-1-2-4 in accordance with the random code. Thus, the video information read out of storage will be displayed in the original sequence for this block, i.e. video lines 1-2-3-4.

The shuffling of a group of video lines on a block-by-block basis where each block is less than an entire field is desirable in comparison to shuffling of the entire field in order to use smaller memories and lesser numbers of associated address generators and other required components. However, the probability that a particular line will be displaced an increasing distance from the original position during shuffling significantly depends on the size of the block. Thus for a small block of about eight video lines, the expected displacement during shuffling of any given line is restricted to the original eight positions. For instance, using probability theory, in shuffling a block of eight video lines the expected value of line displacement of the first line ca be calculated to be equal to 3.5 lines. The average expected value of line displacement (AEVD) for all lines in the block can also be computed as a figure of merit. In the instance of a block of eight lines, the AEVD equals 2.625 for normal block shuffling, i.e. random shuffling of a block of eight video lines.

The AEVD value can of course be increased by increasing the size of the block to include more video lines, such as 16 or 32 which is desirable. However, while the AEVD value always increases with block size, eventually a block size is reached which is undesirable as it contains a large number of video lines requiring a larger memory and more associated memory addressing components. In the extreme, of course, the "block" could consist of the entire field, which as indicated before is undesirable.

Accordingly, it is desired to provide a video scrambling technique using line shuffling of video lines within discrete blocks of video lines less than the entire field and wherein the AEVD value can be increased without the need to increase the block size of video lines.

SUMMARY OF THE INVENTION

In accordance with the present invention, a video scrambling technique provides a high degree of masking of the video information contained in a raster scan field using line shuffling within discrete blocks of video lines in the field in a cost effective implementation compared to the prior systems.

More particularly, a block of video lines is divided into top and bottom sub-block portions, the top and bottom sub-block portions are switched, and within each sub-block portion the video lines are randomly shuffled. This significantly improves masking of the original video information compared to the prior line shuffling techniques where all of the video lines within a block of lines are shuffled at once. For example, the calculated expected value of line displacement in shuffling the first line in a block of eight video lines using the switch-shuffle technique of the present invention is found to be equal to 5.5 lines compared to 3.5 lines for the first line with prior block shuffling systems. Thus the AEVD value in this improved "block portion switch-shuffle" scrambling technique equals 4.0 compared to 2.625 for normal block shuffling, which is a significant increase in the AEVD value of more than 52%.

In a preferred embodiment of the invention, the normal video signal is converted to digital form for storing in a memory, with each video line being stored in accordance with a scrambling sequence which may be termed herein as a "half block switch-shuffle".

For example, for a block of eight video lines, eight address registers are used to read a video line out of the memory and to enable the next video line to be written into the same memory position. Sequential operation of the address registers is controlled in accordance with a generated pseudo-random number (PRN) sequence. The PRN sequence is constrained so as to switch the positions of the half block portions so that for instance the original first half block portion with video lines 1–4 is switched with the next half block portion containing video lines 5–8 so that a scrambled block portion sequence is attained which is different than the original block portion sequence. In addition, the PRN sequence is set so that the sequence of video lines is scrambled to be different than the original line sequence. Thus, the half block switch-shuffle scrambling technique of the present invention for the assumed block of eight video lines will result in a scrambled block of video lines containing a scrambled block portion sequence in which the first block portion contains a shuffled sequence of video lines 5–8 followed by a second block containing shuffled video lines 1–4.

It is to be understood that each half block is shuffled in the same manner, and independently, from its counterpart half block. It is possible (probability wise) that one or both half blocks could be left in original order, depending on the PRN sequence for the block. The probability of one or both half blocks being unaltered can be calculated and is very small so that this probability will occur infrequently for realistic block sizes.

In accordance with another aspect of the present invention, the PRN sequence for successive blocks of video lines in the field is continued to be constrained to provide the half block switch-shuffle scrambling, and the PRN sequence and the address register (AR) sequence for one block is used to produce the next address register sequence for the following block.

Generated seed data representing a code identifying the PRN sequence is inserted into the transmitted video signal containing the scrambled video lines in accordance with well-known techniques. Descrambling at the video receiver is initiated by extracting the seed data to regenerate the PRN sequence, transforming the PRN sequence into a new sequence PRN' and controlling eight address registers at the decoder in accordance with the PRN' sequence to write the shuffled video lines into different sections of a decoder memory. As each input shuffled video line is written into the memory, a video line in the memory at that memory position is read out of the memory in sequence so that the video lines are again unshuffled and conform to the original line sequence.

In another embodiment of the present invention, the size of the first block of video lines closest to the top of the field is enabled to grow and/or shrink in time. The effect of this growing or shrinking of the first block is that the video appears to roll down or up the display, thereby creating an effect which can be annoying to view, along with increasing the masking of video information. The speed and time in one direction of the roll can be made variable so that a desired amount of roll can be achieved.

The present invention permits excellent masking of the transmitted video information with a minimum of circuit components necessary to implement the technique.

DESCRIPTION OF THE PREFERRED EMBODIMENTS

Figure 1:
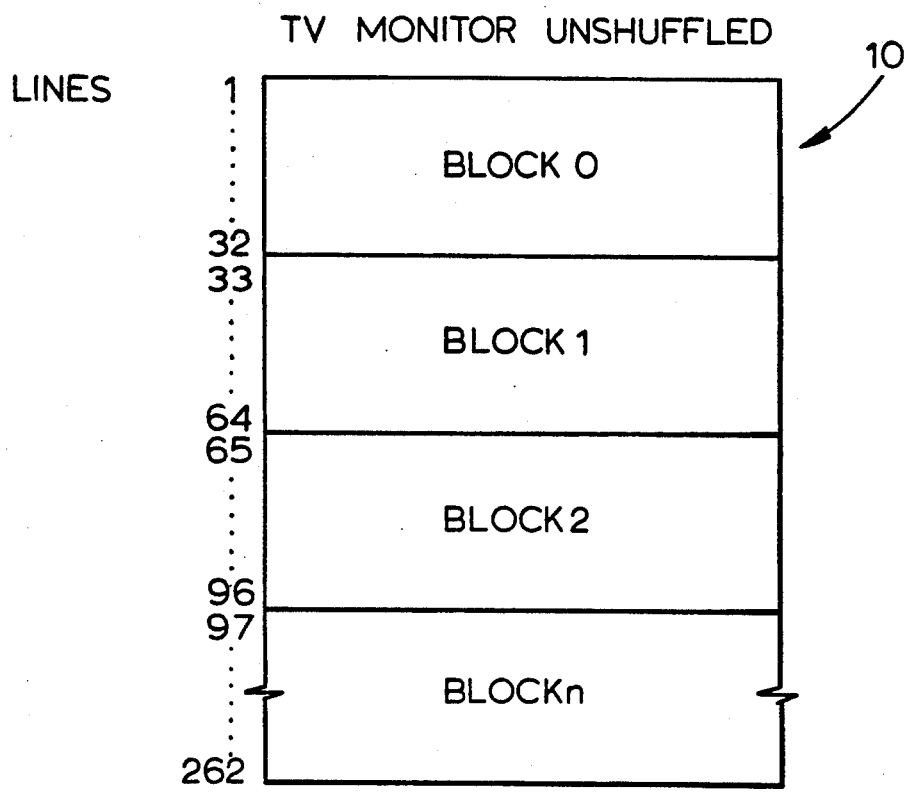
FIG. 1 is a schematic illustration of a standard television raster scan field of video information.

Referring now to FIG. 1, there is illustrated a standard television raster scan field 10 of video information composed of horizontal video lines 1–262. As shown in FIG. 1, for purposes of illustration of the scrambling technique of this invention, the television field has been divided into several blocks each containing 32 lines so that video lines 1–32 are in block 0; video lines 33–64 are in block 1; video lines 65–96 are in block 2; etc.

Figure 2:
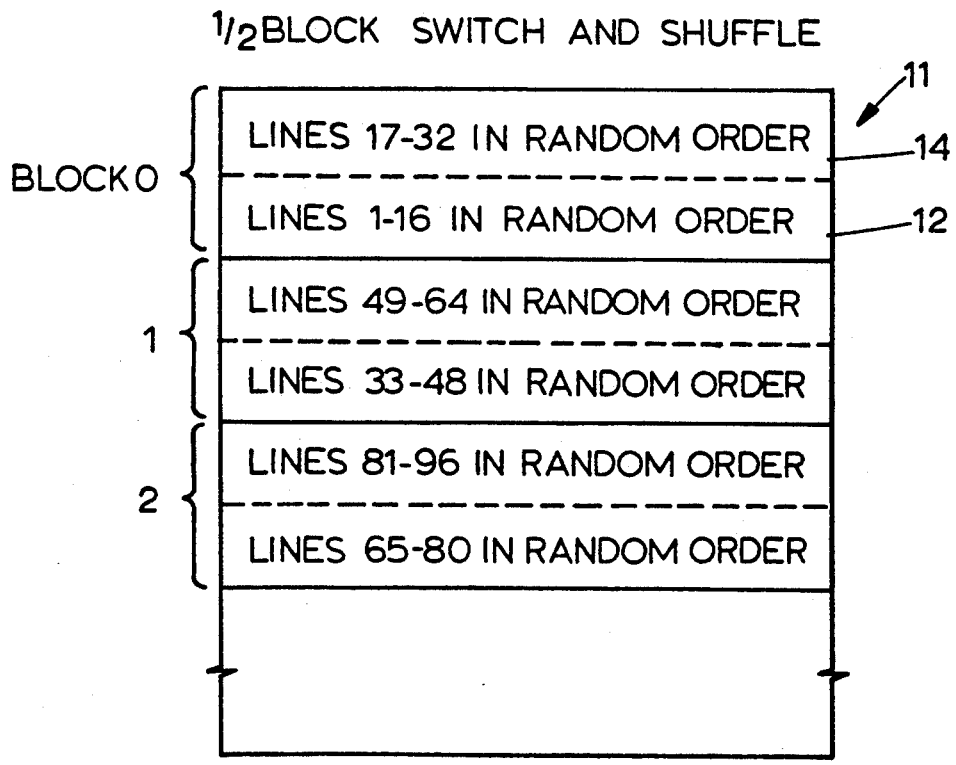
FIG. 2 is a schematic illustration of a television field in which the video lines have been block portion switched-shuffled in accordance with the present invention for an illustrative block size of 32 lines.

Reference may now be made to FIG. 2 showing a scrambled field 11 wherein the original field has been subjected to the block portion switch-shuffle scrambling technique of the present invention. Note that each original block of video lines has been divided into two block portions. Thus, block 0 contains a block portion 12 with video lines 1–16 and a block portion 14 with video lines 17–32. As can be seen in FIG. 2, the original sequence of block portions 12 and 14 have been switched so that block portion 14 with lines 17–32 now precedes block portion 12 containing lines 1–16. In addition to the half block sequence switch shown in FIG. 2, the video lines in each block also has been shuffled in random order, so that FIG. 2 illustrates the half block switch-shuffle scrambling video technique in accordance with the preferred embodiment of the present invention.

It is to be understood of course that rather than the illustrated half block portions, a block could be divided into respective block portions of unequal line sizes, such as 80/20%; 60/40%; etc., if desired. For purposes of conveniently illustrating the block portion switch-shuffle scrambling technique of the present invention, a half block switch-shuffle scrambling of video lines will be described hereinafter with respect to blocks each having eight video lines.

Figure 3:
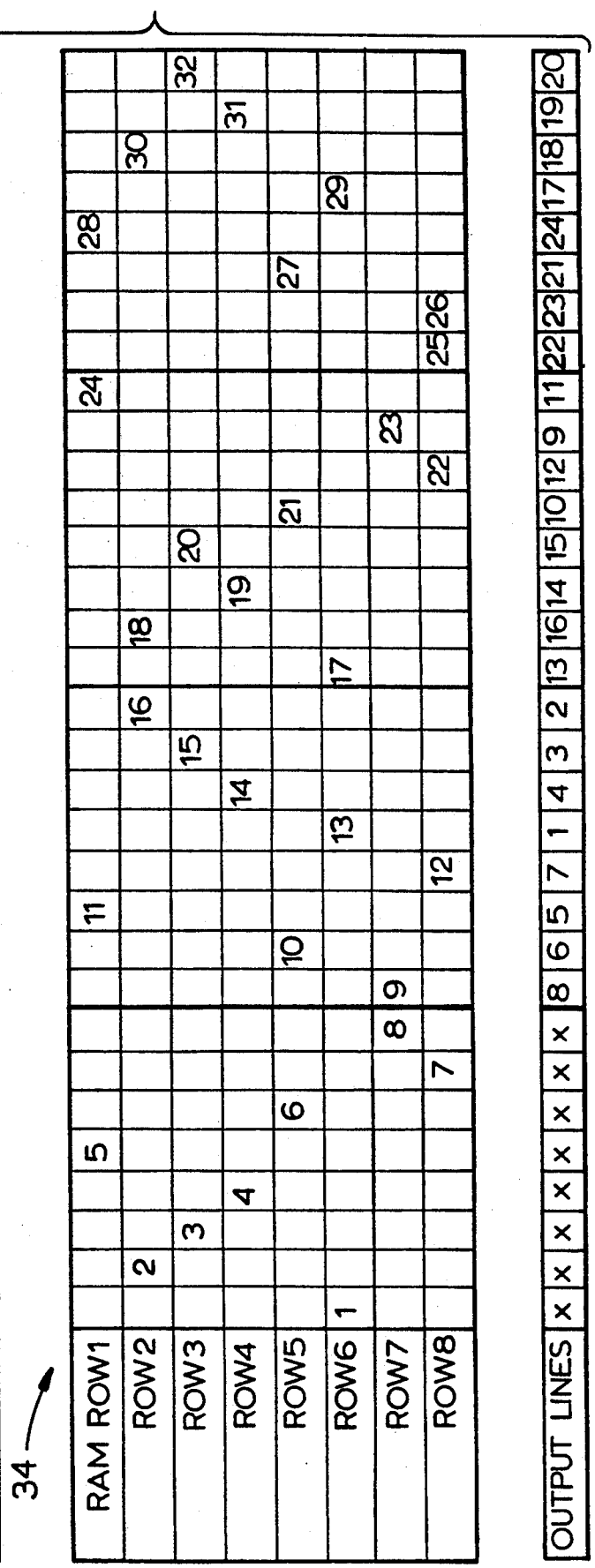
FIG. 3 is a schematic illustration of several blocks of video lines to be scrambled in a desired random sequence and a helpful illustration showing writing/reading the lines into/out of memory to obtain the desired scrambled output lines for the half block switch-shuffle preferred embodiment of the present invention for an illustrative block size of 8 lines.

Referring now to FIG. 3, there is schematically illustrated four blocks of a standard television raster scan field shown horizontally for convenience, and wherein each block contains eight video lines. The first block in the sequence, block 0, contains video lines 1–8; the next block 1, contains video lines 9–16; etc. A pseudo random number (PRN) sequence is generated so that the blocks will be split into half block portions of four video lines each, and with the block portions sequence being switched and the video lines in each block being randomly shuffled—all in response to the PRN sequence.

As shown in FIG. 3, the first PRN sequence for block 0 is set at 8-6-5-7-1-4-3-2. Block portion switch-shuffle in accordance with this PRN sequence will then provide a scrambled line sequence in block 0 in which the second block portion with lines 5–8 will be switched in sequence with the first block portion containing lines 1–4. Thus, the desired scrambled sequence of output lines for block 0 is illustrated as 8-6-5-7 for the switched second block portion followed by output lines 1-4-3-2 of the switched first half block portion.

As noted in FIG. 3, the remaining PRN sequences shown for blocks 1, 2, 3, etc. also are constrained to provide a half block switch-shuffle of the video lines in accordance with the present invention. Note for instance in block 1, the desired shuffling of block 1 lines is such that the half block portions sequence is changed from the original sequence. In the desired scrambled sequence, the second block portion with output lines 13–16 precedes the first half block portion with output lines 9–12. Thus as shown in FIG. 3, the desired switched-shuffled sequence of output lines 13-16-14-15 will precede the first block portion output lines 10-12-9-11.

Figure 5:
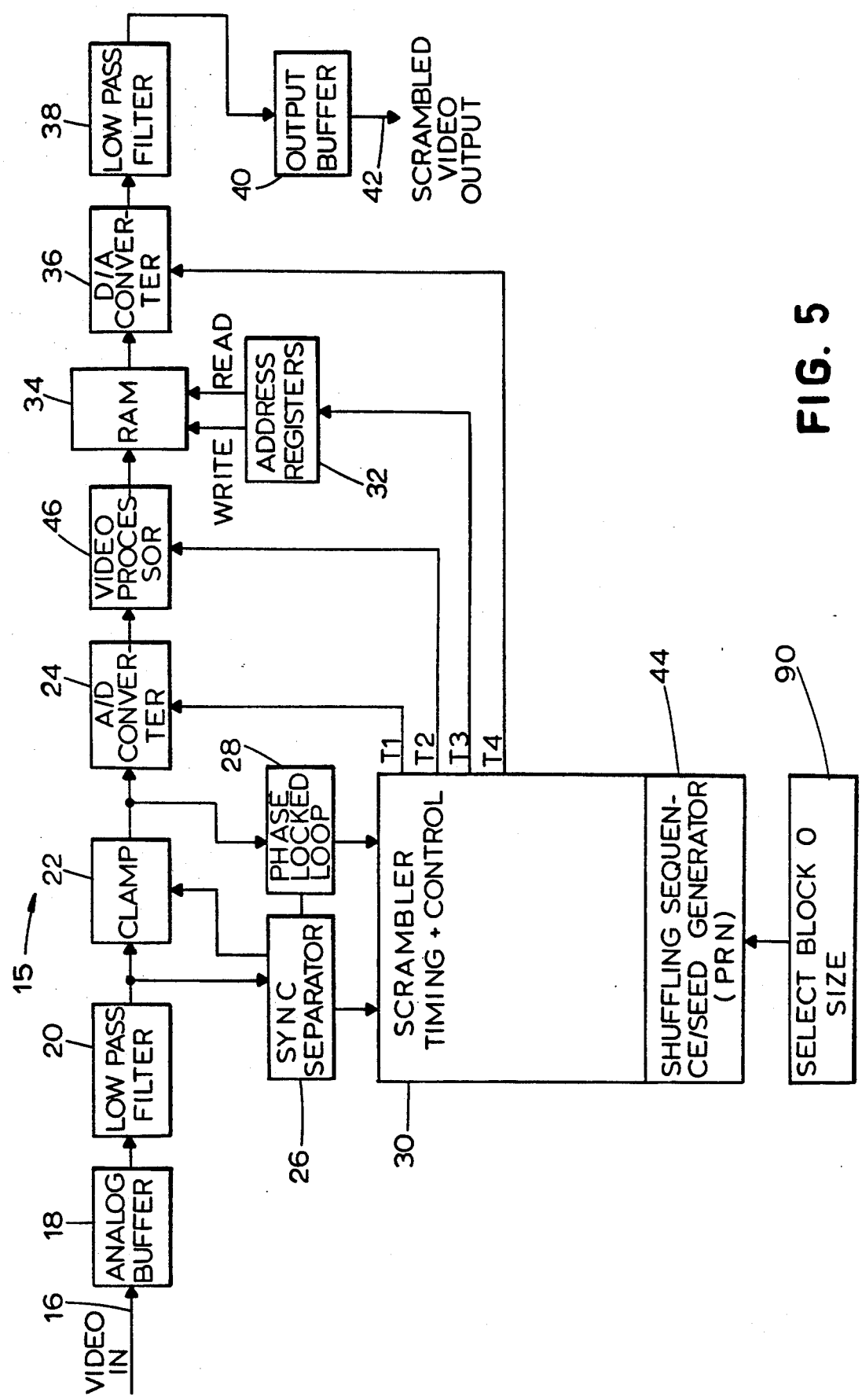
FIG. 5 is a block diagram of encoder apparatus in accordance with the preferred embodiment.

The following description, taken with the scrambling apparatus 15 shown in FIG. 5 and the helpful illustration of FIG. 3, sets forth a preferred embodiment of the half block switch-shuffle technique of the present invention to provide the desired output line scrambling shown in FIG. 3 in accordance with the illustrated PRN sequences. A video signal on input line 16 is coupled to an analog buffer 18, and in turn to a low pass filter 20, a clamp 22, and an analog-to-digital converter 24 to convert the video signal into digital form. A sync separator 26 and phase locked loop 28 are coupled to a timing and control unit 30 for receiving the standard horizontal and vertical sync signals in the video signal and providing the timing information to the timing and control unit 30.

Timing and control unit 30 controls a group of address registers 32 to provide the required write and read addresses to a RAM memory 34 in order to shuffle the input video signal. The shuffled video signal from RAM 34 is coupled to a digital to analog converter 36 to transform the signal back to analog form and is then passed through a low pass filter 38 and an output buffer 40 to transmit a scrambled video output signal on scrambler output line 42.

Signals T1 and T4 are derived directly from the phase locked loop 28 and are clock signals at the conversion rate, clocking the A/D converter 24 and the D/A converter 36, respectively. Timing and control signal T3 controls the scrambling (shuffling) of the video lines by setting the location in RAM memory 34 where each video line will be written or entered and the location from which the video lines will be read through address registers 32. Timing and control unit 30 keeps track of which line in a field, and which pixel in the line, the current video sample occupies. This is done with the sync separator (horizontal and vertical sync signals) connected to separate line and pixel counters (not shown). In this manner the timing and control unit 30 is able to identify exactly where the current video sample occurs in the input video signal.

A PRN shuffling sequence/seed generator 44 generates seed data setting the PRN sequences. As illustrated in FIG. 5, the seed data is inserted into the video data stream through signal T2 coupled to a video processor 46. One method of sending the seed data is to insert the seed data bits in the video signal during the vertical interval. Other well-known techniques exist and can be utilized if desired. The seed data consists of a code which is used to generate the pseudo-random shuffling sequence which controls the half block switch-shuffle sequence of the scrambled video. Timing and control unit 30 utilizes the PRN sequence and controls the RAM 34 through address registers 32 so the input video signal is written into the RAM in accordance with an address register (AR) sequence and read out of the RAM also according to an AR sequence to provide the shuffling sequence in accordance with the present invention as will be described in connection with FIG. 3.

Referring now to FIG. 3, as previously described there is schematically illustrated a series of blocks of video lines labeled block 0, block 1, block 2, etc. each containing eight contiguous video lines of information similar to that shown in an original television field 10 of FIG. 1. The desired output lines for block 0 are in the desired sequence 8-6-5-7-1-4-3-2 which corresponds to the PRN sequence for that block. Note that in accordance with the invention, the first block portion of block 0 containing video lines 1–4 has been switched in sequence with the second block portion containing lines 5–8 so that in the desired sequence, the output lines would be in the sequence of 8-6-5-7 representing randomly shuffled lines of the second block portion followed by desired line sequence 1-4-3-2 representing the randomly shuffled lines of the first block portion.

The address register (AR) sequence for block 0 is initially randomly initialized as shown in FIG. 3 to be 6-2-3-4-1-5-8-7.

To shuffle blocks of eight video lines, eight address registers 32 are used. It is to be understood that address registers 32 shown in FIGS. 5 and 6 could be located within timing and control unit 30 and could be implemented by software registers such as of a microprocessor. Other well known techniques may be utilized to implement address registers 32.

After each block is shuffled (by using the address registers 32) the address registers are updated using the PRN sequence, to shuffle the next block. FIG. 3 schematically illustrates RAM memory 34 having RAM row positions 1-8. Starting with block 0, and in accordance with the AR sequence, input line 1 is stored in the RAM row 6 position; input line 2 is stored in the RAM row 2 position; input line 3 is stored in the RAM row 3 position; input line 4 is stored in the RAM row 4 position; etc.

The PRN sequence and the AR sequence for block 0 are used o produce the next AR sequence for block 1 according to the following:

$$AR_{k+1}[j] = AR_k[\,PRN_k[j]\,];$$

where
k is the block sequence; and
j is the AR sequence position or the PRN sequence position.

As an example with reference to FIG. 3, $$\begin{aligned}AR_1[3] &= AR_0[PRN_0[3]] \\ &= AR_0[5] \\ &= 1\end{aligned}$$

Using the above-identified shuffling algorithm, the AR sequence for each subsequent block is generated and is illustrated in FIG. 3. The manner in which the information on the video lines is written into and read out of the RAM 34 will now be described.

Initially, it must be understood that as one video line is read out of the RAM memory and transmitted, the next video line is written into the same memory position. Accordingly, with the AR sequence known as shown by the example in FIG. 3, shuffling is accomplished by writing input sequential lines to the RAM memory locations (RAM rows 1-8) determined by the $AR_k$ sequence preceded by reading out (transmitting) the video line in that RAM location. Thus, starting with the AR sequence for block 1, RAM row location 7 is read out first (output line 8) and input line 9 is written into RAM row location 7. Next, RAM row location 5 is read out (output line 6) and input line 10 is written into RAM row location 5; then, RAM row location 1 is read out (output line 5) and input line 11 is written into RAM row location 1; etc.

Below the schematic illustration of RAM 34 in FIG. 3 there is illustrated the sequence of scrambled output lines starting with video line 8 and in sequence continuing as indicated, i.e., output lines 8-6-5-7-1-4-3-2, which corresponds to the initial sequence of desired output lines for the field coded by the PRN sequence (with a delay of one block) in accordance with the present half block switch-shuffle scrambling technique.

Figure 4:
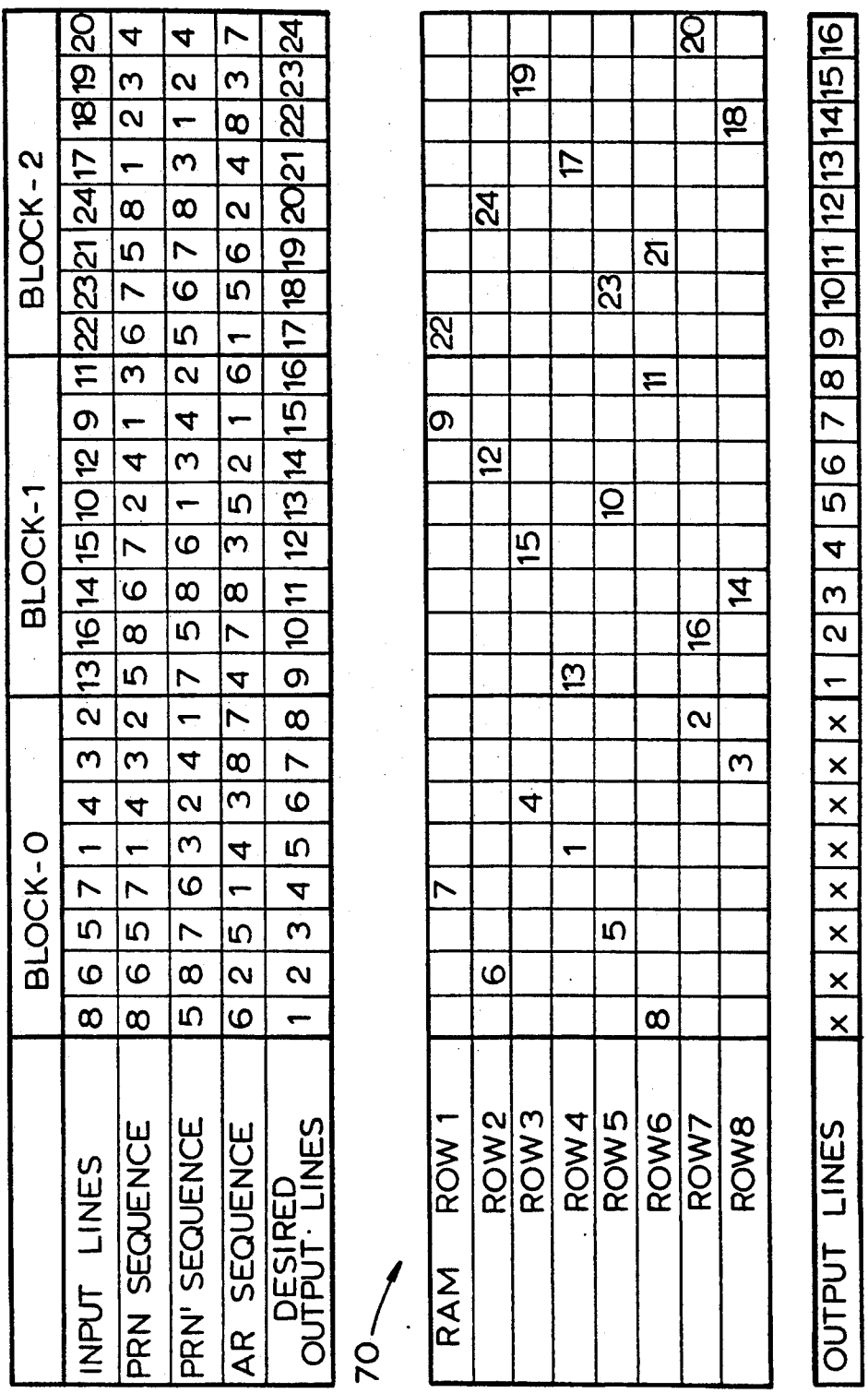
FIG. 4 is a schematic illustration similar to FIG. 3, showing decoding of the scrambled lines of FIG. 3 to obtain output lines in the original line sequence.
Figure 6:
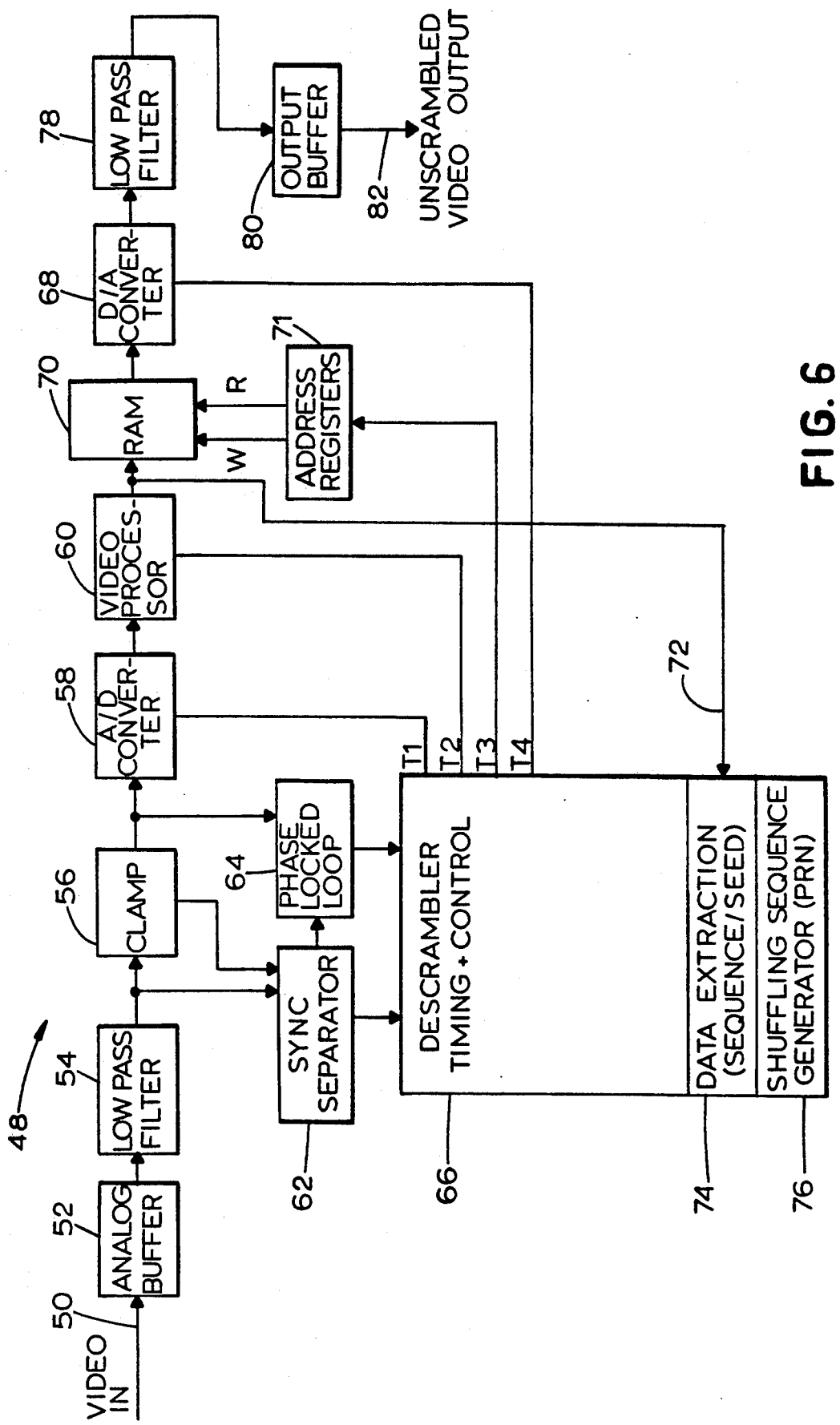
FIG. 6 is a block diagram of decoder apparatus in accordance with the preferred embodiment.

Referring now to FIGS. 4 and 6, the manner in which the scrambled video lines are descrambled will be described. FIG. 4 has been arranged similar to FIG. 3 for convenience of illustrating the present invention. FIG. 4 schematically illustrates three blocks of a scrambled television field, starting with a contiguous sequence of block 0, block 1, and block 2. Initially, it is assumed that the PRN sequence at the decoder is identical to the sequence used at the encoder. Also, it is assumed that the one block delay in the shuffled output video lines shown in FIG. 3 has been compensated for by delaying the PRN sequence at the decoder.

FIG. 4 therefore illustrates the shuffled input lines to the decoder for block 0, block 1, block 2, which lines are the same as the shuffled output lines in the same sequence as shown in FIG. 3. FIG. 4 also illustrates that the PRN sequence for each block, i.e. the first block, the second block, the third block, is the same at the decoder as at the encoder. It has been found that the easiest way (conceptually) to do the unshuffling is to transform the PRN sequence into a new sequence PRN'. Then the same technique used for shuffling can be used for unshuffling.

The PRN sequence can be transformed to a new PRN' sequence in accordance with the following relationship:

$$PRN'[j] = PRN\,[\,i,\text{ such that } PRN[i] = j\,].$$

For example, PRN' [1] = i, such that PRN [i] = 1 so that PRN' [1] = 5, since entry one is found in the fifth entry of the PRN sequence. The remaining entries for the PRN' sequence of blocks 0, 1, 2 are shown in FIG. 4.

Starting with an initial random AR0 sequence for block 0 (which does not need to be identical to the AR0 sequence for block 0 in the encoder) the AR sequences for the following blocks are obtained using the PRN, sequence in the same manner as described previously in scrambling. The desired descrambled sequence of desired output lines is shown in FIG. 4 which illustrates that the video lines of the television field are rearranged back into the original video line sequence.

FIG. 6 illustrates a descrambler apparatus 48 which taken with the helpful illustration of FIG. 4 decodes and thereby unscrambles the video lines which in accordance with the preferred embodiment shown in FIGS. 3 and 5 have been subjected to the half block switch-shuffle technique of the present invention. Thus, video signals incorporating half block switch-shuffled video lines transmitted on output line 42 of FIG. 5 are received on an input line 50 and then are successively coupled through an analog buffer 52, a low pass filter 54, a clamp 56, and an analog to digital converter 58 to convert the video signal into digital form at the input to a video processor 60.

A sync separator 62 and a phase locked loop 64 are coupled to a descrambler timing and control unit 66 to provide the illustrated timing and control signals T1, T2, T3, T4. Timing signals T1 and T4 are derived directly from the phase locked loop 64 and comprise clock signals at the conversion rate, clocking the A/D converter 58 and a D/A converter 68. Timing and control signal T3 controls the descrambling (deshuffling) of the video lines by setting the location in a RAM memory 70 through address registers (AR) 71 where each input shuffled video sample will be written. The writing of shuffled lines to different (but determined) sections of RAM memory 70 using the AR sequence causes the video lines, when read out of the memory using the AR sequence to be unshuffled.

The descrambler timing and control unit 66 keeps track of which line in a field, and which pixel in the line, the current video sample occupies. This is done with the sync separator (horizontal and vertical sync signals) connected to separate line and pixel counters. In this manner, the descrambler timing and control unit can identify exactly where the current video sample occurs in the scrambled input video signal. With this information, the timing and control unit 66 can calculate where to store this sample in RAM memory 70, once it knows the shuffling sequence used in the scrambler.

The descrambler identifies the shuffling sequence used in the scrambler from the video input data seed.

For instance, assuming that seed data bits consisting of a code have been inserted into the video signal during the vertical interval, then, upon receipt of timing and control signal T2, video processor 60 removes the seed data from the scrambled video and supplies same on connection line 72 to a data extraction sub-assembly 74 to regenerate the PRN sequence which represents the half block switch and shuffling sequence of the scrambled video. In a manner well-known in the art, the data extraction unit 74 recovers the seed data bits using information from the line and pixel counters to identify the data bits among the seed data on connection line 72.

A shuffling sequence generator 76 regenerates the PRN shuffling sequence using the data obtained from the data extraction unit 74 as a seed, and performing a regeneration technique. Once the PRN shuffling sequence is obtained, the descrambler timing and control unit 66 can now write the video sample to the proper section of RAM memory 70. The deshuffled video signal is coupled to D/A converter 68 to transform the signal back to analog form and is then passed through a low pass filter 78 and an output buffer 80 to provide an unscrambled video output on output line 82.

The manner in which the information on the video lines is written into and read out of RAM 70 through address registers 71 will now be described. As previously indicated in connection with the scrambler apparatus 15 shown in FIG. 5, and with respect to the helpful illustration of FIG. 3, in the descrambler 48 shown in FIG. 6, as one video line is read out of RAM 70 and coupled to the output line 82, the next video line is written into the same memory position. Accordingly, with the AR sequence known as shown by the example in FIG. 4, deshuffling is accomplished by writing input sequential lines to the RAM memory locations (RAM rows 1–8) determined by the $AR_k$ sequence, preceded by reading out the video line in that same RAM row location.

Thus, starting with the AR sequence for block 1, RAM row location 4 is read out first (output line 1) and input line 13 is written into RAM row location 4. Next, RAM row location 7 is read out (output line 2) and input line 16 is written into RAM row location 7; then, RAM row location 8 is read out (output line 3) and input line 14 is written into RAM row location 8; etc.

Below the schematic illustration of RAM 70 with rows 1–8 in FIG. 4, there is illustrated the sequence of output lines starting with video line 1 and in sequence continuing as indicated, i.e. output lines 1-2-3-4-5-6-7-8, which corresponds to the desired initial sequence of video lines for the field decoded by the same PRN sequence which was used to provide the half block switch-shuffle scrambled signal. Note that the output lines shown in FIG. 4 are in the continuous original sequence of video lines 1-8 for the first block; video lines 9-16 for the second block; etc. of the original television raster scan field 10 of FIG. 1.

It is understood of course that additional scrambling techniques may be combined with the block portion switch-shuffle technique of the present invention. For instance, a line sliding technique can be added where the beginning of one or more video lines in each block can be moved along the line on a varied basis. In such a case, in addition to the line position sequence, i.e. PRN sequence derived from the data stream, there would need to be derived a pixel position in the scrambled line so as to properly set the pixel position in the decoded, unscrambled line.

Video inversion is another scrambling technique which may be layered on top of line shuffling and would offer a scrambled video picture with a higher degree of masking. If video inversion is used, the inversion can be set through timing and control signal T2 enabling the video processor 46 during scrambling. Appropriate signals from T2 can then be provided to enable the video processor 60 in the descrambler to invert the data back to normal polarity.

In addition, in a further enhancement of the present invention, the size of the first block of video lines closest to the top of the field can be enabled to grow and/or shrink in time. For example, in a first television field, the block 0 could be made up of eight lines which are switched and shuffled whereas the remaining blocks can be made up of 32 lines with the half blocks switched and shuffled as previously described. The next television field could have a growing block 0 of 16 lines which are switched and shuffled. The next television field could have a block 0 of 32 video lines with the block portions switched and shuffled; and the next television field could have block 0 shrinking again to 8 video lines which are switched and shuffled. Growing and/or shrinking of the size of the block 0 which is closest to the top of the television field enables the video to appear to be rolling down or up the display. This creates a severe annoyance factor in attempting to view the television field along with the increase in the masking of the video information contained in the field. As desired, the speed and time in one direction of the rolling of the video display can be made variable.

The block 0 growing/shrinking feature is illustrated in FIG. 5. If this alternative embodiment of the invention is desired, a select block 0 size unit 90 sets the number of video lines, i.e. the size, of the block 0. Select block 0 size unit 90 can incorporate a random number generator for changing the block 0 size in each consecutive field from, for instance, 8 lines to 16 lines, to 32 lines, and back to 8 lines, etc., as noted above. The output of the select block 0 size unit 90 is coupled to the PRN shuffling sequence/seed generator to coordinate the PRN sequence sets for block 0, block 1, etc., which eventually results in timing and control signal T3 controlling block shuffling of the video lines as previously described.

A random sizing of block 0 causes the remaining blocks and the resulting video display to jump up and down in position. The television display is thus scrambled and given an annoying jittery appearance in addition to masking of the video information.

As an alternative to the random block 0 size, the first block can be made to constantly grow in size with each field until a maximum block 0 size is reached and the size is then reduced. In this case, the select block 0 size unit 90 incorporates a counter to increment the block 0 size growth and a maximum size detect circuit. As an example, with a maximum block 0 size of 32 video lines and an incremental growth of 3 video lines from field to field, the size of block 0 can start at one line and become 4 lines, 7, 10, 13, 16, 19, 22, 25, 28, 31, 2, 5, 8, 11, etc.

This increasing size of block 0 from field to field causes an annoying "rolling" appearance of the blocks down the video display in the manner of a vertical sync problem. The speed of the apparent roll is controlled by how much the size of block 0 is incremented each field. An increment of three lines with a maximum block 0 size of 32 lines appears to give the most annoying effect, however other increments and maximum block 0 sizes can be set as desired.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A method of scrambling video lines of a raster scan video image, comprising the steps of:
    dividing the video lines into a plurality of contiguous blocks of video lines and subdividing each block into first and second block portions each having a number of video lines arranged in an original line sequence and wherein the first and second block portions are arranged in an original block portion sequence contiguous with each other;
    rearranging the original block portion sequence of the block portions into a scrambled block portion sequence different than the original block portion sequence and wherein the first and second block portions remain contiguous with each other;
    rearranging the original line sequence of the video lines of at least one of the block portions into a scrambled line sequence different than the original line sequence for the block portion; and
    developing an indication of the original line sequences and the original contiguous block portion sequence.

2. The method of claim 1, wherein the step of dividing includes dividing the block into half block portions.

3. The method of claim 1, wherein said steps of rearranging the original block portion sequence and rearranging the original line sequence includes generating a pseudo-random number (PRN) sequence and controlling said rearranging steps in response to said PRN sequence.

4. The method of claim 3, including the steps of providing a code identifying said PRN sequence and resulting in an indication of the original line sequences and the original block portion sequence.

5. A method of scrambling a block of video lines of a raster scan video image, comprising the steps of:
    dividing the block into first and second block portions each having a number of video lines arranged in an original line sequence and wherein the first and second block portions are arranged in an original block portion sequence contiguous with each other;
    rearranging the original block portion sequence of the block portions into a scrambled block portion sequence different than the original block portion sequence and wherein the first and second block portions remain contiguous with each other;
    rearranging the original line sequence of the video lines of at least one of the block portions into a scrambled line sequence different than the original line sequence for the block portion;
    developing an indication of the original line sequences and the original contiguous block portion sequence; and
    providing the first block of said raster scan video image for a first video field of said raster scan video image with a first number of video lines, and varying the number of video lines of said first block for subsequent video fields of said raster scan video image.

6. A method of scrambling video lines of a raster scan video composed of video fields, comprising the steps of:
    dividing the video lines into a plurality of blocks of video lines with a first block followed by at least another block each having a number of video lines arranged in an original line sequence;
    varying the number of video lines in said first block on a video field by video field basis while maintaining the number of video lines per field unchanged;
    rearranging the original line sequence of the video lines of said blocks into a scrambled line sequence different than the original line sequence for the blocks; and
    developing an indication of the original line sequences.

7. A method of scrambling video lines of a raster scan video image, comprising the steps of:
    generating a pseudo-random number sequence capable of (1) dividing the video lines into a plurality of contiguous blocks of video lines and subdividing each block into first and second block portions each having a number of video lines arranged in an original line sequence and wherein the block portions are arranged in an original contiguous block portion sequence, (2) switching the block portion sequence while maintaining the first and second block portions contiguous with each other, and (3) shuffling the video lines of at least one of the block portions into a scrambled line sequence different than the original line sequence for the block portion;
    storing the video lines in a memory in a certain order responsive to said pseudo-random number sequence; and
    reading the video lines from the memory in the certain order.

8. A method of decoding scrambled video lines of a raster scan video image in a video signal to reconstruct the original video lines, the original video lines divided into a plurality of contiguous blocks of video lines and each block subdivided into two block portions each having at least two contiguous video lines arranged in an original line sequence wherein the two block portions are arranged in an original block portion sequence contiguous with each other and wherein the scrambled video lines includes said plurality of contiguous blocks of video lines with said two block portions each including at least two contiguous video lines arranged in a scrambled line sequence different than the original line sequence wherein the block portions are arranged in a scrambled block portion sequence different than the original block portion sequence with the two block portions remaining contiguous with each other and wherein the scrambled video lines are decoded using sequence data from the video signal indicating the original block portion sequence and the original line sequences for the block portion, comprising the steps of:
    extracting the sequence data from the video signal; and
    using the extracted sequence data to rearrange the block portions and the video lines of the scrambled video lines to restore the original block portion sequence and the original line sequences.

9. A method of decoding scrambled video lines of a raster scan video image in a video signal to reconstruct the original video lines, the original video lines divided into a plurality of contiguous blocks of video lines and each block subdivided into two block portions each having at least two contiguous video lines arranged in an original line sequence wherein the two block portions are arranged in an original block portion sequence contiguous with each other and wherein the scrambled video lines includes said plurality of contiguous blocks of video lines with said two block portions each including at least two contiguous video lines arranged in a scrambled line sequence different than the original line sequence wherein the block portions are arranged in a scrambled block portion sequence different than the original block portion sequence with the two block portions remaining contiguous with each other and wherein the scrambled video lines are decoded using sequence data from the video signal indicating the original block portion sequence and the original line sequences for the block portion, comprising the steps of:

extracting the sequence data from the video signal;

selecting each of the video lines from the scrambled video lines;

using the extracted sequence data to load the selected video lines in a memory wherein the memory stores the video lines in a certain order in response to the sequence data; and reading the video lines from the memory in a certain order in response to the sequence data.

10. A method of decoding scrambled video lines of a raster scan video image in a video signal to reconstruct the original video lines, the original video lines having divided into a plurality of contiguous blocks of video lines and each block subdivided into two block portions each having at least two contiguous video lines arranged in an original line sequence wherein the two block portions are arranged in an original block portion sequence contiguous with each other and wherein the scrambled video lines includes said plurality of contiguous blocks of video lines with said two block portions each including at least two contiguous video lines arranged in a scrambled line sequence different than the original line sequence wherein the block portions are arranged in a scrambled block portion sequence different than the original block portion sequence with the two block portions remaining contiguous with each other and wherein the scrambled video lines are decoded using sequence data from the video signal indicating the original block portion sequence and the original line sequences for the block portion, comprising the steps of:

extracting the sequence data from the video signal;

loading the video lines of the scrambled video lines in a memory in a first order using the sequence data; and using the extracted sequence data to read the video lines from the memory in a second order different than the first order.

11. A method of transmitting original video signals of a raster scan video image wherein the video signals includes a plurality of contiguous blocks each subdivided into two contiguous block portions arranged in original block positions wherein each block portion includes at least two contiguous video lines arranged in an original line sequence, comprising the steps of:

scrambling the original video signals by switching the block positions of the two contiguous block portions of at least one of the blocks, with the two block portions remaining contiguous with each other, shuffling the video lines of the at least one block portion into a scrambled line sequence, and developing sequence data indicating the original contiguous block positions of the block portions and the original line sequences of the block portions;

transmitting the scrambled video signals and the sequence data to a descrambler; and descrambling the scrambled video signals using the sequence data by rearranging the block portions and the video lines back to the original block positions and the original line sequences, respectively.

12. The method of claim 11, wherein the step of developing sequence data includes the step of generating a pseudo-random number sequence for controlling the switching of the block positions and the shuffling of the video lines.

13. Apparatus for scrambling video lines of a raster scan video image, comprising:

means for dividing the video lines into a plurality of contiguous blocks of video lines and subdividing each block into first and second block portions each having a number of video lines arranged in an original line sequence and wherein the block portions are arranged in an original contiguous block portion sequence;

means for rearranging the original block portion sequence of the block portions into a scrambled block portion sequence different than the original block portion sequence and wherein the first and second block portions remain contiguous with each other;

means for rearranging the original line sequence of the video lines of at least one of the block portions into a scrambled line sequence different than the original line sequence for the block portion; and means for developing an indication of the original line sequences and the original contiguous block portion sequence.

14. Apparatus according to claim 13, including means for dividing the block into half block portions.

15. Apparatus according to claim 13, wherein said means for rearranging the original block portion sequence and said means for rearranging the original line sequence includes means for generating a pseudo-random number (PRN) sequence and controlling said rearranging steps in response to said PRN sequence.

16. Apparatus according to claim 15, including means for providing a code identifying said PRN sequence and resulting in an indication of the original line sequences and the original block portion sequence.

17. Apparatus for scrambling video lines of a raster scan video image, comprising:

means for generating a pseudo-random number sequence capable of (1) dividing the video lines into a plurality of contiguous blocks of video lines and subdividing each block into first and second block portions each having a number of video lines arranged in an original line sequence and wherein the block portions are arranged in an original contiguous block portion sequence, (2) switching the block portion sequence while maintaining the first and second block portions contiguous with each other, and (3) shuffling the video lines of at least one of the block portions into a scrambled line sequence different than the original line sequence for the block portion;

means for storing the video lines in a memory in a certain order responsive to said pseudo-random number sequence; and means for reading the video lines from the memory in the certain order.

18. Apparatus for decoding scrambled video lines of a raster scan video image in a video signal to reconstruct the original video lines, the original video lines divided into a plurality of contiguous blocks of video lines and each block subdivided into block portions each having at least two contiguous video lines arranged in an original line sequence wherein the two block portions are arranged in an original block portion sequence contiguous with each other and wherein the scrambled video lines includes said plurality of contiguous blocks of video lines with said two block portions each including at least two contiguous video lines arranged in a scrambled line sequence different than the original line sequence wherein the block portions are arranged in a scrambled block portion sequence different than the original block portion sequence with the two block portions remaining contiguous with each other and wherein the scrambled video lines are decoded using sequence data from the video signal indicating the original block portion sequence and the original line sequences for the block portion, comprising:

means for extracting the sequence data from the video signal lines; and means for using the extracted sequence data to rearranged the block portions and the video lines of the scrambled video lines to restore the original block portion sequence and the original line sequences.

19. Apparatus for decoding scrambled video lines of a raster scan video image in a video signal to reconstruct the original block of video lines, the original video lines divided into a plurality of contiguous blocks of video lines and each block subdivided into two block portions each having at least two contiguous video lines arranged in an original line sequence wherein the two block portions are arranged in an original block portion sequence contiguous with each other and wherein the scrambled video lines includes said plurality of contiguous blocks of video lines with said two block portions each including at least two contiguous video lines arranged in the scrambled line sequence different than the original line sequence wherein the block portions are arranged in a scrambled block portion sequence different than the original block portion sequence with the two block portions remaining contiguous with each other and wherein the scrambled video lines are decoded using sequence data from the video signal indicating the original block portion sequence and the original line sequences for the block portion, comprising:

means for extracting the sequence data from the video signal;

means for selecting each of the video lines from the scrambled video lines;

means including a memory for suing the extracted sequence data to load the selected video lines in the memory wherein the memory stores the video lines in a certain order corresponding to the original line sequences and the original block portion sequence; and means for reading the video lines from the memory in the certain order.

20. Apparatus for decoding scrambled video lines of a raster scan video image in a video signal to reconstruct the original video lines, the original video lines divided into a plurality of contiguous blocks of video lines and each block subdivided into two block portions each having at least two contiguous video lines arranged in an original line sequence wherein the two block portions of the original block of video lines are arranged in an original block portion sequence contiguous with each other and wherein the scrambled block of video lines includes said plurality of contiguous blocks of video lines with said two block portions each including at least two contiguous video lines arranged in a scrambled line sequence different than the original line sequence wherein the block portions of the scrambled block of video lines are arranged in a scrambled block portion sequence different than the original block portion sequence with the two block portions remaining contiguous with each other and wherein the scrambled block of video lines are decoded using sequence data from the video signal indicating the original block portion sequence and the original line sequences for the block portion, comprising:

means for extracting the sequence data from the video signal;

means including a memory for loading the video lines of the scrambled video lines in the memory in a first order corresponding to the scrambled line sequences and the scrambled block portion sequence; and means for using the extracted sequence data to read the video lines from the memory in a second order different than the first order corresponding to the original line sequences and the original block portion sequence.

21. Apparatus for transmitting original video signals of a a raster scan video image wherein the video signals includes a plurality of contiguous blocks each subdivided into two contiguous block portions arranged in original block positions wherein each block portion includes at least two contiguous video lines arranged in an original line sequence, comprising:

means for scrambling the original video signals by switching the block positions of the two contiguous block portions of at least one of the blocks, with the two block portions remaining contiguous with each other, means for shuffling the video lines of the at least one block portion into a scrambled line sequence, and means for developing sequence data indicating the original contiguous block positions of the block portions and the original line sequences of the block portions;

means for transmitting the scrambled video signals and the sequence data to a descrambler; and means for descrambling the scrambled video signals using the sequence data by rearranging the block portions and the video lines back to the original block positions and the original line sequences, respectively.

22. Apparatus according to claim 21, wherein said means for developing sequence data includes means for generating a pseudo-random number sequence for controlling the switching of the block positions and the shuffling of the video lines.

* * * * *

UNITED STATES PATENT AND TRADEMARK OFFICE
CERTIFICATE OF CORRECTION

PATENT NO. : 5,321,748
DATED : June 14, 1994
INVENTOR(S) : David E. Zeidler, et al It is certified that error appears in the above-indentified patent and that said Letters Patent is hereby corrected as shown below:

Column 7, line 9, change "used o" to --used to--.

Column 8, line 21, delete "PRN," and insert --PRN'--

Column 15, line 62, delete "sung" and insert --using--.

Signed and Sealed this

Fourteenth Day of March, 1995

Attest:

BRUCE LEHMAN

Attesting Officer    Commissioner of Patents and Trademarks